United States Patent
Dirmeier et al.

[11] Patent Number: 5,938,383
[45] Date of Patent: Aug. 17, 1999

[54] CONNECTOR ASSEMBLY AND METHOD OF FORMING SAME

[75] Inventors: Georg Dirmeier; Manfred Haller, both of Stuttgart; Siegfried Emmann, Weinstadt, all of Germany

[73] Assignee: Daimler-Benz Aktiengesellschaft, Stuttgart, Germany

[21] Appl. No.: 08/929,259

[22] Filed: Sep. 15, 1997

[30] Foreign Application Priority Data

Sep. 14, 1996 [DE] Germany .............. 196 37 592

[51] Int. Cl.$^6$ .................. F16B 31/00; F16B 33/04; F16B 39/28
[52] U.S. Cl. .................. 411/5; 411/263; 411/307; 411/513
[58] Field of Search .................. 411/2, 3, 4, 5, 411/222, 263, 307, 513, 514

[56] References Cited

U.S. PATENT DOCUMENTS

| | | | |
|---|---|---|---|
| 1,957,784 | 5/1934 | Johnson | 411/263 X |
| 3,405,751 | 10/1968 | Parr | 411/307 |
| 3,599,528 | 8/1971 | Kushnick . | |
| 3,602,976 | 9/1971 | Grube | 411/2 X |
| 4,097,108 | 6/1978 | Prodel | 411/4 X |
| 4,244,661 | 1/1981 | Dervy | 403/243 |
| 4,661,031 | 4/1987 | Heine | 411/263 |
| 5,018,920 | 5/1991 | Speakman | 411/43 |

FOREIGN PATENT DOCUMENTS

| | | |
|---|---|---|
| 1 944 805 | 11/1970 | Germany . |
| 37 25 792 | 2/1989 | Germany . |
| 43 22 717 | 1/1995 | Germany . |
| 1 298 095 | 11/1972 | United Kingdom . |

OTHER PUBLICATIONS

Witte, Dr.–Ing. H., et al., "Bolts for Steel Constructions", Merkblatt 322, pp. 1–35.
Long–Lok, Schraubensicherungen GmbH brochure, 6 pages.

*Primary Examiner*—Neill Wilson
*Attorney, Agent, or Firm*—Evenson, McKeown, Edwards & Lenahan, P.L.L.C.

[57] ABSTRACT

A connector assembly that is subjected to alternating loads by an axial flow of force between zero and various maximum values, with an outer assembly component designed as a hollow section and an inner assembly component located in the outer one and fitting by virtue of its shape. In order to detect failure of the assembly caused by a fatigue fracture produced by overloads at the end point in the assembly direction, even before it develops, in a simple fashion within the functional assembly, the assembly comprises a rear area with play that begins at the end of the connection that points in the assembly direction and a forward zero-play area of the inner assembly component that abuts the latter and is located inside the outer assembly component. The transition between the areas forms a desired breakage location between the two ends of the connection, at which point one of the assembly components, upon the formation of a locally defined crack that runs in the transverse direction of the assembly, breaks as a result of fatigue after a certain number of overloads. The distance of the required breakage location from the ends of the connection is so dimensioned and the cooperation of the assembly components is so designed that the inner assembly component within the outer assembly component forms a residual assembly that can withstand alternating loads after fracture.

20 Claims, 2 Drawing Sheets

CONNECTOR ASSEMBLY AND METHOD OF FORMING SAME

BACKGROUND AND SUMMARY OF THE INVENTION

The invention relates to a connector assembly that is that is subjected to alternate loads by an axial flow of force between zero and various maximum values, and a method of forming same.

A connector assembly is known from DE 43 22 717 A1. By means of the assembly described in this document, in a three-part commercial vehicle frame consisting of front and rear cross members made of lightweight metal castings as well as a middle piece of a side member that connects the front cross members with the rear cross members, a permanent connection of the cross members with the middle piece of the side member composed of extrusion-molded sections made of lightweight metal is achieved. The assembly is formed by a sleeve-shaped connecting element that constitutes one assembly component, said element being inserted into the internal contour of a hollow section of the middle piece of the side member that constitutes the other assembly component, forming a connection that is secured by shape and force. At the other end, the connection element, provided there with an internal thread, is fastened for example by screwing to the respective cross member. The assembly is subjected to extremely high loads by alternating stresses in the axial direction, in other words tension and compression, as well as transverse loads during the driving of the commercial vehicle, so that in the course of the operating life, overloads on the connection can develop because of a lack of ability to expand or exceeding of stresses, especially in the area of the end of the connecting element located in the section, that lead to cracking of the section as the result of a sudden fatigue fracture. This fracture of the section cannot be detected in advance. The cracking of the section destroys the assembly, and the connecting element loses its supporting ability, whereupon the respective cross member comes free from the middle piece. As a result, unforeseeable accidental consequences can result, especially as a function of the cargo being carried during driving.

A goal of the invention is to improve a connector assembly such that failure of the assembly as the result of a fatigue fracture resulting from overload at the end pointing in the assembly direction can be detected in simple fashion in the functional assembly even before it occurs.

This and other goals have been achieved according to the present invention by providing a connector assembly, comprising: a hollow outer assembly component; and an inner assembly component arranged in the outer assembly component with an outer periphery of the inner assembly component adjacent an inner periphery of the outer assembly component over an axial distance; the inner assembly component being axially fixed relative to the outer assembly component along a portion of said axial distance defining a zero-play area, and the inner assembly component being axially movable relative to the outer assembly component along a portion of said axial distance defining an axial-play area, said zero-play area and said axial-play area axially abutting each other to define a desired fracture location.

This and other goals have been achieved according to the present invention by providing a method of forming a connector assembly having a hollow outer assembly component and an inner assembly component, said method comprising: arranging said inner assembly component in said outer assembly component with an outer periphery of the inner assembly component adjacent an inner periphery of the outer assembly component over an axial distance; axially fixing the inner assembly component relative to the outer assembly component along a portion of said axial distance in order to define a zero-play area; allowing the inner assembly component to be axially movable relative to the outer assembly component along a portion of said axial distance defining an axial-play area axially abutting said zero-play area, in order to define a desired fracture location between said zero-play area and said axial-play area.

According to the invention, the fatigue fracture of the assembly is displaced from the connecting end that points in the assembly direction to the other connecting end, with the breakage of one of the assembly components not immediately destroying the entire connection. Instead, a residual connection remains since the assembly components overlap one another over a reduced connecting length in a manner that produces a connection. The required strength for the connection with respect to additional axial alternating stresses, also with respect to overstresses, and hence sufficient carrying capacity of the connection, is ensured. This has the effect of extending the lifetime of the connector assembly, since the assembly, after the first fracture, fails completely only when, as a result of fatigue, a crack appears at the connecting end that points in the assembly direction. As a result of the displacement of the area that is subjected to the highest load, this area is, in essence, relieved of its load so that after the first fatigue fracture occurs between the connecting ends, the remaining structure will support a plurality of alternate stress cycles until a second fatigue fracture that is responsible for the final failure of the connection occurs at the connecting end that points in the assembly direction. The displacement of the fracture site occurs because, by providing an area that has play and another area immediately adjoining it with zero play, at the transition between the two areas there is less axial expandability than in the area of the assembly end pointing in the assembly direction and therefore any exceeding of stresses is displaced from this end of the connection to the transition. The assembly direction is the direction of the translational insertion movement of the inner assembly component into the outer assembly component when fitting the two assembly components together.

The first crack can be viewed, in essence, as a precursor for the later cracking of the connector assembly. The crack runs through the location of the specified breaking point between the connecting ends as a result of the abrupt increase in axial expandability of the connector assembly, in other words because of discontinuities in rigidity, immediately behind the point on the side of the assembly end locally defined in the transverse direction of the assembly. This point can be investigated, for example by inspection, in a simple fashion and at low cost to determine whether a crack has occurred there or not, in order to evaluate the loading capacity. When the first crack appears, which can be detected in simple fashion and is displaced locally, an intervention can be made accordingly by replacing the assembly component so that the connector assembly again has its full loading capacity. Serious consequential damage, especially when the connector assembly is used in frame parts of commercial vehicles, is thus avoided and the safety of the vehicle when driving is therefore increased.

According to the invention, failure of the connector assembly takes place in two stages that proceed clearly separately from one another in time and space, so that when the first crack occurs, but the connection can still provide support and therefore remains capable of accepting loads, a regular monitoring of the location can detect this before the connection finally fails. In this way, otherwise necessary expensive safety measures such as costly cable-type catching devices or stops can be avoided that are provided to protect against unforeseeable cracking at the end of the connection that points in the assembly direction.

Other objects, advantages and novel features of the present invention will become apparent from the following detailed description of the invention when considered in conjunction with the accompanying drawings.

DETAILED DESCRIPTION OF THE DRAWINGS

Figure 1:
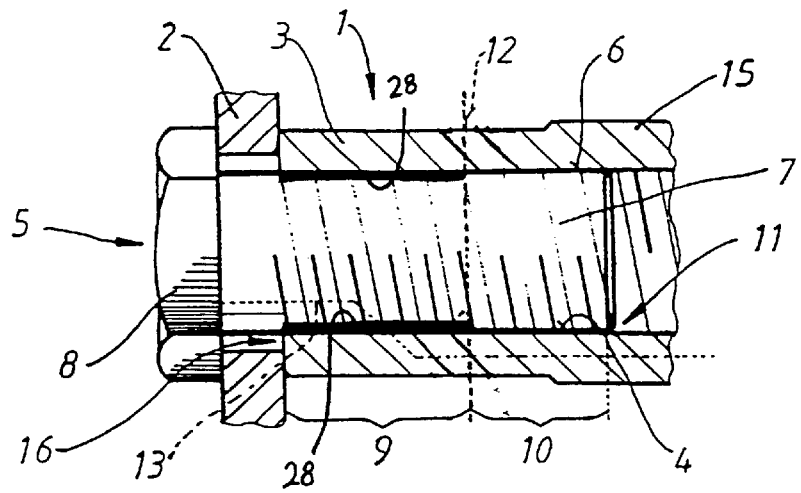
FIG. 1 is a lateral lengthwise section of a connector assembly according to a preferred embodiment of the present invention in the form of a threaded connection which is shown in the undamaged state.

FIG. 1 shows a connector assembly designed as a threaded connection 1 as used in vehicles, for example in commercial vehicles such as tractors (i.e., tractor-trailers). To assemble a lightweight modular frame, front and rear cross members designed as lightweight metal cast alloy parts 2 are fastened to a side member intermediate module formed by a plurality of lightweight metal extrusion-molded hollow sections 3.

For this purpose, hollow section 3 (outer assembly component) has an internal thread 4 into which bolt 5 (inner assembly component) with external thread 6 on its shaft 7 is threaded. Bolt 5 is additionally glued with an adhesive 28 from the beginning of engagement of thread 6, 4 in the vicinity of bolt head 8, in other words from front connecting end 16 to hollow section 3, with the adhesive 28 curing and thus dividing threaded connection 1 into a front zero-play area 9 and a rear area 10 with axial play directly axially adjacent each other. To ensure sufficient loading capacity of a threaded connection 1 which is made of aluminum, it is necessary that the overlapping length of hollow section 3 and bolt 5 be at least 2.5 times the diameter of the bolt so that the admissible surface pressure or stretching limit of bolt 5 is not exceeded. In a steel-threaded connection, the minimum overlap length is in the range of 1.1 times the bolt diameter.

In zero-play area 9, threaded connection 1 is very rigid and has very limited elasticity, especially in the axial direction of threaded connection 1, so that it exceeds the slight expandability of threaded connection 1 at the end of connection 11 that points in the assembly direction. At this end 11 of the connection, because of the low axial expandability of the connection, excess stress normally develops upon overloading, which after some time leads to fatigue and thus to a crack in the connector assembly. As a result of the provision of the zero-play area 9, the exceeding of stress when the connector assembly is overloaded is displaced to a transition location 12 from zero-play area 9 to axial-play area 10. The abrupt transition location 12 defines a desired fracture location at which only one of the assembly components, i.e., the weaker of bolt 5 (FIG. 2) or hollow section 3 (FIG. 3), breaks in the circumferential direction, with the break being limited in the axial direction. The hollow section 3 and the bolt 5 are designed with relative strengths (e.g. as a function of their cross-sectional areas and material strengths) such that a selected one of the components will eventually crack and break at transition location 12 due to a plurality of alternating stresses applied to the joint connection (particularly in the axial direction). However, the joint connection is designed such that the above-mentioned first break does not completely destroy the connection, but the remaining connection remains capable of providing support. This is accomplished by designing the location of transition location 12, and the strength of the hollow section 3 and the bolt 5, such that after the above-mentioned first fatigue fracture, the length and strength of the remaining connection between the remaining unfractured portion of bolt 5 and the remaining unfractured portion of hollow section 3 will be sufficient to continue to provide functional support over further alternating load cycles.

Figure 2:
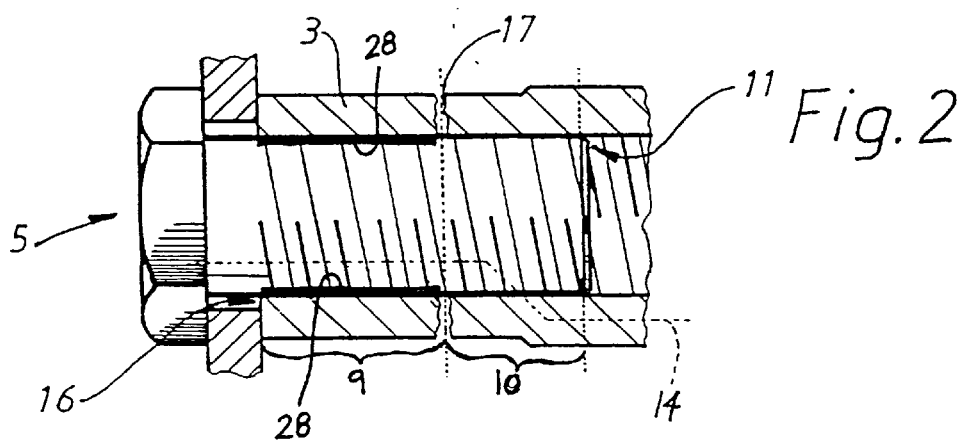
FIG. 2 is a lateral lengthwise section through a connector assembly according to the present invention showing crack formation at one specified breakage location in the hollow section.
Figure 3:
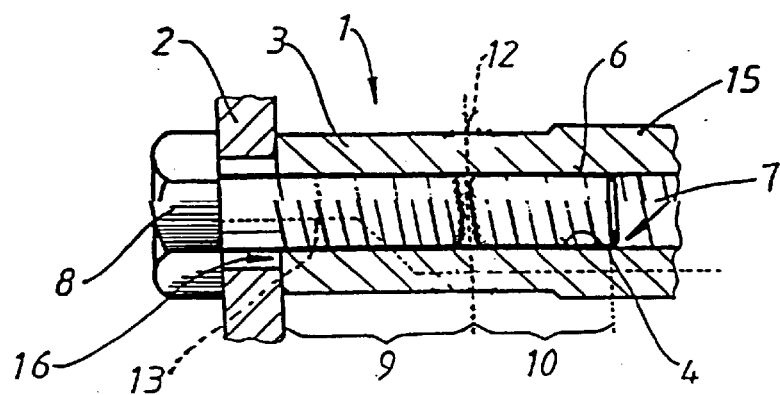
FIG. 3 is a lateral lengthwise section through a connector assembly according to the present invention showing crack formation at one specified breakage location in the bolt.

Following crack formation at transition location 12, threaded connection 1 does not break off completely because the axial-play area 10 remains connected and assumes the supporting function of threaded connection 1 by itself. This is illustrated by the force flow lines 13 and 14, represented as dotted lines in FIGS. 1–3. In FIG. 1, the force flow of threaded connection 1 during normal, failure-free stress in zero-play area 9 is transferred from bolt 5 to hollow section 3 and continues in the latter. Following overloading where the hollow section 3 is designed to crack, as shown in FIG. 2, the force flow enters the original axial-play area 10 in order then to be transferred to hollow section 3, with the broken-off portion of the hollow section 3 no longer providing support. Following overloading where the bolt 5 is designed to crack, as shown in FIG. 3, the force flow is transferred from bolt 5 to hollow section 3 in the zero-play area 9, with the broken-off portion of the bolt 5 no longer providing support.

Figure 4:
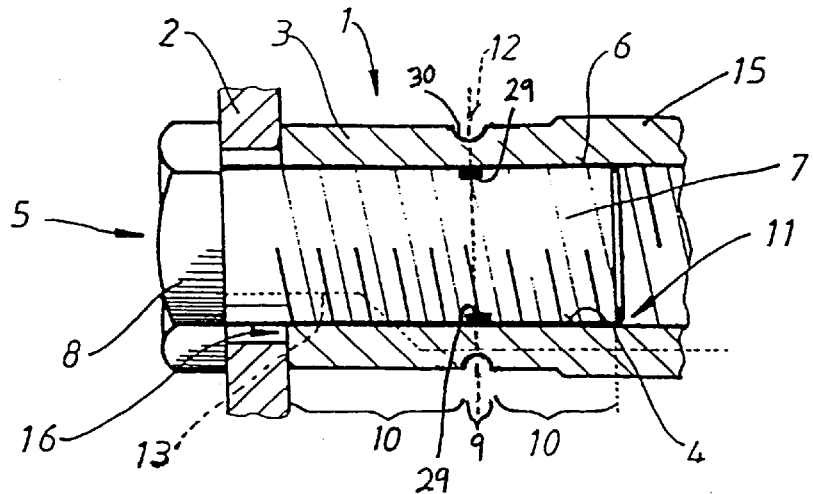
FIG. 4 is a lateral lengthwise section through a connector assembly according to the present invention showing an adhesive between the bolt and the hollow section at a single location and showing a recess in the hollow section.

In order to define the transition location 12 that forms the specified breakage location, it is also contemplated to provide bolt 5 with an adhesive only on a narrow circumferential strip 29, as shown in FIG. 4. The adhesive strip 29 then defines transition location 12 to two areas 10 with play, one in front of and one behind transition location 12, with only the adhesive strip 29 forming a zero-play area 9.

As shown in FIGS. 1–2, hollow section 3 at connecting end 11 has a circumferential wall thickness 15 that is thicker in order to increase the stability of the connection at this point, so that the displacement of a crack 17 to the specified breaking location is favored. Moreover, by providing a circumferential notch 30 around the circumference of hollow section 3 at the location of transition location 12, as shown in FIG. 4, the localization of crack 17 can be increased further. It is noted that although FIG. 4 shows both the above-mentioned narrow circumferential adhesive strip 29 and the circumferential notch 30, these features are independent of each other and may be combined separately with other embodiments.

Crack 17 occurs along transition location 12 in the circumferential direction of threaded connection 1. The previously determined location of crack 17 can be easily detected upon inspection to determine whether the entire connector assembly is in danger of being destroyed or not. For example, if threaded connection 1 is designed so that the wall thickness of hollow section 3 is relatively small relative to the thickness of the bolt, as shown in FIG. 2, hollow section 3 will crack at transition location 12. In this case, the crack 17 can be seen during visual inspection since hollow section 3 is the outer of the two assembly components. However, if the wall thickness of hollow section 3 is large by comparison with the bolt thickness, as shown in FIG. 3, bolt 5 will break, and the forward zero-play area 9 of threaded connection 1 will assume the further supporting function of the connection. In this case, the crack 17 that develops is not visible and must be detected using appropriate detection devices, for example by using ultrasound or by measuring electrical conductivity.

Figure 5:
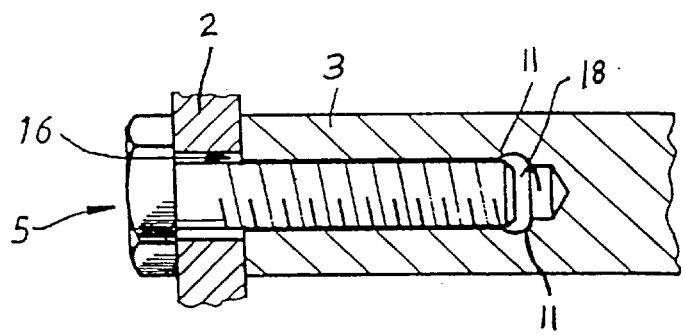
FIG. 5 is a lateral lengthwise section of a connector assembly according to the present invention as a threaded connection in the undamaged state, with a bulging of the bore at the end of said bore.

According to the embodiment shown in FIG. 5, hollow section 3 has a constant diameter outer wall with no wall thickening 15 at the connecting end 11 that points in the assembly direction. In order to counteract the notching effect that adversely effects the holding ability of threaded connection 1, and in order thus to increase the lifetime of threaded connection 1, the bore of hollow section 3, which has a thread, has a smooth cylindrical axial expansion 18, a so-called undercut that is rounded like a barrel with a large rounding radius.

The formation of the zero-play area 9 can be accomplished in various ways. As described above, bolt 5 can be glued with an adhesive 28 to hollow section 3 in the front zero-play area 9, as shown in FIGS. 1–2. A microencapsulated two-component adhesive that is distributed in the flights of the threads of bolt 5 is suitable for this purpose. When the bolt is screwed in, because of the shearing forces that then occur, the capsules that each contain an adhesive component burst, whereupon the adhesive components are mixed and after curing form an especially strong and rigid adhesive connection between the two assembly components. Alternatively, bolt 5 can be glued with an adhesive 28 to hollow section 3 at a single location 29, as shown in FIG. 4.

Alternatively, it is contemplated to have a bolt with self-cutting threads in the front zero-play area 9, with the inside diameter of the bore of hollow section 3 being smaller in this area than the outside diameter of outside thread 6. In addition, it is also contemplated, on a partial area of outside thread 6 of bolt 5, to have a metallic intermediate layer such as, for example, a strip of metal foil or a braid, with which bolt 5 can be screwed into hollow section 3, so that this partial section forms zero-play area 9. Non-metallic intermediate layers such as hemp or a strip of plastic film may also be used as substitutes.

Figure 6:
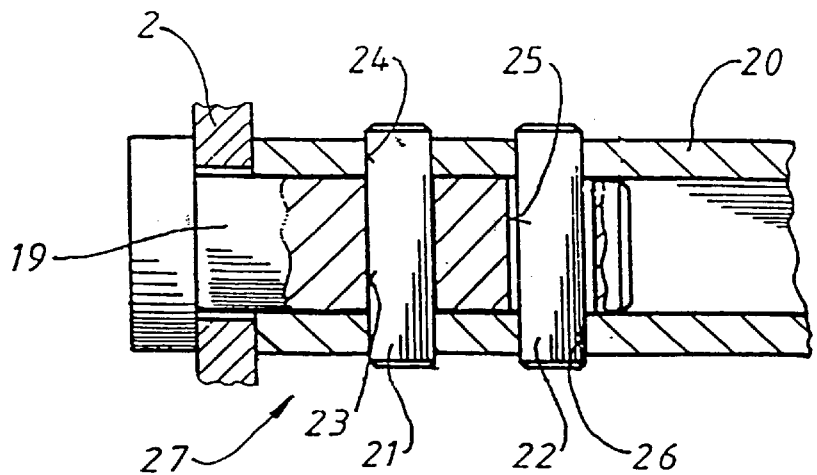
FIG. 6 is a lateral lengthwise section showing a connector assembly according to the present invention in the form of a pin and tube connection.

Another type of connector assembly is shown in FIG. 6. In this case the inner assembly component is formed by a socket pin 19, while the tubular outer assembly component 20, in contrast to the hollow section 3 of threaded connection 1, has no thread. Socket pin 19 is inserted into assembly component 20 and retained by two cross pins 21 and 22 pressed into transverse bores 23 and 24 aligned with one another as well as 25 and 26 of assembly components 19, 20. Cross pin 21 is inserted into front cross bores 23 and 24 to form a zero-play press fit, both in socket pin 19 and also in assembly component 20. Cross pin 22, on the other hand, is located with a press fit in rear cross bore 26 of assembly component 20, but has considerable play within rear cross bore 25 of socket pin 19. For this purpose, cross bore 25 is expanded in the manner of an elongate hole in the axial direction of the assembly.

Because of the very limited axial expandability of the connector assembly at this point, caused by the firm connection of assembly components 19, 20 via the cross pin 21, the connection is subjected to a higher load there than at the end of connection 11 that points in the assembly direction. As a result, overloading of the connection results in a crack 17 in only one assembly component, i.e., the weaker of socket pin 19 and assembly component 20, depending on the dimensioning of the wall thickness of assembly component 20 and the thickness of socket pin 19 relative to one another, so that the area of the connection with play at the location of second rear cross pin 22 provides the necessary carrying capacity for further loading-carrying capacity of the connection. The choice of the shape of the cross section of assembly component 20, in other words of the hollow section, can be made freely with the pin-tube assembly 27 described.

As an alternative or in addition to the cross pin connections 21, 22, the socket pin 19 may be connected to assembly component 20 by gluing, with a forward area of socket pin 19 coated with a curing adhesive, forming a very rigid connection with assembly component 20 that has only limited or zero elasticity axially, and with a rear area of socket pin 19 axially adjoining this area being glued to assembly component 20 by a permanently elastic adhesive, said elastic adhesive permitting deflections of socket pin 19 in the axial direction within the scope of play.

In summary then, the present invention comprises a connector assembly which is separated in into separate connection areas of varying axial expandability of an inner assembly component 5, 19 placed in an outer hollow assembly component 3, 20, with the change in expandability at a transition location 12 from one area to the other taking place abruptly. When excessive loads occur at this transition location 12, at the end 11 that points in the assembly direction of the connection, a stress limit is exceeded so that as a result of fatigue, after a certain number of stress cycles, a crack 17 forms in a weaker of the two assembly components depending on the ratio between the wall thicknesses of sections 3, 20 and the thickness of inner assembly components 5, 19. A fatigue fracture at the end of the connection that points in the assembly direction is thus delayed. The area of the connector assembly between a crack 17 in section 3, 20 and the end of connector assembly 11, after this crack develops, has sufficient carrying capacity to withstand additional alternating stresses in the assembly direction. If crack formation occurs on inner assembly component 5, 19, the area of the connection between crack 17 and the connection end 16 that faces away from the assembly direction provides the support. It is only at a later point in time that crack formation occurs at end 11 of the connection in the assembly direction for the reasons given above, which finally completely destroys the connection so that it cannot provide any support. The transition location 12 defined between zero-play area 9 and axial-play area 10 constitutes a locally deliberately directed required fracture location at which the development of a first crack 17, functions as an indicator for the loadability of the connector assembly and thus as an indication of potential subsequent complete failure of the connector assembly, said first crack 17 preceding a second crack that ultimately completely breaks the connector assembly and being located axially at a distance from the second crack.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A connector assembly, comprising:

a hollow outer assembly component; and an inner assembly component arranged in the outer assembly component with an outer periphery of the inner assembly component adjacent an inner periphery of the outer assembly component over an axial distance;

the inner assembly component being axially fixed relative to the outer assembly component along a portion of said axial distance defining a zero-play area, and the inner assembly component being axially movable relative to the outer assembly component along a portion of said axial distance defining an axial-play area, said zero-play area and said axial-play area axially abutting each other to define a desired fracture location in one of said outer assembly component and said inner assembly component.

2. A connector assembly according to claim 1, wherein said inner assembly component and said outer assembly component are designed such that only a desired one of the inner and outer assembly components will fracture at said desired fracture location due to a plurality of alternating loads on said assembly, and said desired fracture location being located such that after said fracture of said desired one of the inner and outer assembly components, a remaining unfractured portion of said inner and outer assembly components will support further of said alternating loads.

3. A connector assembly according to claim 1, wherein said inner assembly component comprises a bolt with an external thread and said outer assembly component comprises an internal thread, said external thread and said internal thread being threadedly engaged over said axial distance.

4. A connector assembly according to claim 3, wherein said zero-play area is formed by gluing said inner and outer assembly components with a curing adhesive.

5. A connector assembly according to claim 3, wherein said zero-play area is formed by gluing said inner and outer assembly components with a curing adhesive comprising microcapsules, said microcapsules being placed in the external thread of bolt prior to assembly, such that said microcapsules burst and react to form said curing adhesive when said external thread is screwed into said internal thread.

6. A connector assembly according to claim 3, wherein a partial axial section of said inner periphery of the outer assembly component is smaller than said outer periphery of the bolt in said zero-play area, such that during assembly said external thread of the bolt is self-tapped into said partial axial section to form said zero-play area.

7. A connector assembly according to claim 3, wherein an intermediate layer is applied to a portion of the external thread of bolt in order to form said zero-play area.

8. A connector assembly according to claim 3, wherein a portion of the inner periphery of the inner assembly component adjacent the internal thread, at an end pointing in an assembly direction, is enlarged to form a cylindrical axial expansion that with a rounded radius.

9. A connector assembly according to claim 1, wherein the inner assembly component comprises a threadless socket pin which is connected to the outer assembly component proximate an end portion and proximate a middle portion.

10. A connector assembly according to claim 9, wherein the outer periphery of the threadless socket pin is glued to the inner periphery of the outer assembly component over said zeroplay area with a first adhesive that has substantially no axial elasticity, and wherein the outer periphery of the threadless socket pin is glued to the inner periphery of the outer assembly component over said axial-play area with a second adhesive that is axially elastic.

11. A connector assembly according to claim 9, wherein the threadless socket pin is coupled to the outer assembly component by at least two axially spaced cross pins, one of said cross pins being coupled to the socket pin and the assembly component with substantially zero play, and another of said cross pins being coupled to the socket pin with play in the axial direction.

12. A connector assembly according to claim 1, wherein said zero-play area is formed by gluing said inner and outer assembly components with an adhesive.

13. A connector assembly, comprising:

a hollow outer assembly component; and an inner assembly component arranged in the outer assembly component with an outer periphery of the inner assembly component adjacent an inner periphery of the outer assembly component over an axial distance;

means for coupling said outer assembly component to said inner assembly component such that the inner assembly component is axially fixed relative to the outer assembly component along a portion of said axial distance defining a zero-play area, and the inner assembly component is axially movable relative to the outer assembly component along a portion of said axial distance defining an axial-play area, said zero-play area and said axial-play area axially abutting each other to define a desired fracture location in one of said outer assembly component and said inner assembly component.

14. A connector assembly according to claim 13, wherein said means for coupling is an adhesive.

15. A connector assembly according to claim 13, wherein the inner assembly component comprises a threadless socket pin which is connected to the outer assembly component proximate an end portion and proximate a middle portion.

16. A method of forming a connector assembly having a hollow outer assembly component and an inner assembly component, said method comprising:

arranging said inner assembly component in said outer assembly component with an outer periphery of the inner assembly component adjacent an inner periphery of the outer assembly component over an axial distance;

axially fixing the inner assembly component relative to the outer assembly component along a portion of said axial distance in order to define a zero-play area;

allowing the inner assembly component to be axially movable relative to the outer assembly component along a portion of said axial distance defining an axial-play area axially abutting said zero-play area, in order to define a desired fracture location in one of said outer assembly component and said inner assembly component between said zero-play area and said axial-play area.

17. A method of forming a connector assembly according to claim 16, further comprising:

designing said inner assembly component and said outer assembly component such that only a desired one of the inner and outer assembly components will fracture at said desired fracture location due to a plurality of alternating loads on said assembly; and locating said desired fracture location such that after said fracture of said desired one of the inner and outer assembly components, a remaining unfractured portion of said inner and outer assembly components will support further of said alternating loads.

18. A method of forming a connector assembly according to claim 16, wherein said zero-play area is formed by gluing said inner and outer assembly components with a curing adhesive.

19. A method of forming a connector assembly according to claim 16, wherein said zero-play area is formed by gluing said inner and outer assembly components with a curing adhesive comprising microcapsules, said microcapsules being placed in the external thread of bolt prior to assembly, such that said microcapsules burst and react to form said curing adhesive when said external thread is screwed into said internal thread.

20. A method of forming a connector assembly according to claim 16, wherein a partial section of said inner periphery of the outer assembly component is smaller than said outer periphery of the bolt in said zero-play area, and further comprising self-tapping said external thread of the bolt into said partial section bolt to form said zero-play area.

* * * * *